(12) United States Patent
Legaignoux

(10) Patent No.: US 6,659,031 B2
(45) Date of Patent: Dec. 9, 2003

(54) BRIDLE FOR POWER KITE LAUNCHING

(75) Inventor: Bruno Legaignoux, Las Terrenas-Samana (FR)

(73) Assignee: Diamond White Servicos de Consultoria Lda., Madeira (PT)

( * ) Notice: Subject to any disclaimer, the term of this patent is extended or adjusted under 35 U.S.C. 154(b) by 0 days.

(21) Appl. No.: 10/169,268

(22) PCT Filed: Apr. 19, 2001

(86) PCT No.: PCT/EP01/04483
§ 371 (c)(1),
(2), (4) Date: Oct. 7, 2002

(87) PCT Pub. No.: WO02/38440
PCT Pub. Date: May 16, 2002

(65) Prior Publication Data
US 2003/0154898 A1 Aug. 21, 2003

(51) Int. Cl.[7] .................................................. B63H 9/04
(52) U.S. Cl. .................................. 114/102.1; 244/155 A
(58) Field of Search ....................... 244/155 A; 114/258, 114/39.16, 39.24, 102.11, 102.1

(56) References Cited

U.S. PATENT DOCUMENTS

| 4,708,078 | A | * | 11/1987 | Legaignoux et al. | .. 114/102.23 |
| 4,892,272 | A | * | 1/1990 | Hadzicki | ................. 244/153 R |
| 6,514,115 | B2 | * | 2/2003 | Harich | .......................... 446/34 |
| 2003/0132348 | A1 | * | 7/2003 | Lynn | .......................... 244/146 |

FOREIGN PATENT DOCUMENTS

| FR | 2797847 | * | 3/2001 |
| GB | 2098946 | * | 12/1982 |

* cited by examiner

Primary Examiner—Stephen Avila
(74) Attorney, Agent, or Firm—Norris McLaughlin & Marcus

(57) ABSTRACT

A flexible, propulsive wing of the 4-line type especially suitable for kiteboarding, has, at the rear portion of the wing tip a first pulley means attached thereto, the rear line being connected to the rear portion of the wing tip through the first pulley means. A pair of auxiliary re-launch lines are provided at each respective side of the wing, each being fixedly connected at one end thereof to the respective rear line, and at the other end to the trailing edge of the wing.

7 Claims, 7 Drawing Sheets

BRIDLE FOR POWER KITE LAUNCHING

BACKGROUND OF THE INVENTION

The present invention relates to power kites of the type controlled by at least two forward and two rear lines on each side. In particular, the present invention relates to an arrangement of the lines in the form of a bridle, allowing for easy launching of the kite.

Power kites are a new breed of kites which are designed primarily toward the sport of kiteboarding, in which a person is pulled along, preferably on the surface of a body of water, by the force of the kite. It is necessary for such a kite to be simple to use, yet have sufficient strength and controllability. A preferred kite is taught by the inventors in U.S. Pat. No. 4,708,078, which is incorporated herein by reference, and which relates to a kite in the form of a spherical gore, with a crescent shaped leading edge, and which is characterized by an inflatable armature.

There are also other variations of power kites, which also rely on a light, flexible structure, but which may, for example, have additional support in the center of the wing to provide a flatter profile at that point. Other kites may have retain the shape of a wing, but may not employ the spherical gore shape. Nevertheless, all of these kites, in order to be workable for kiteboarding, must have a degree of flexibility and should have some curvature at least toward the wing tips. These kites are generally characterized by an inflatable structure made of longitudinal and transversal tubes. Some kites have a "ram air" type structure as in a paraglider, or a combination of the two. As a whole, these propulsive wing kites can be generally classified as 'curved kites'. While it is preferred to use the present invention with the kite shaped as a spherical gore, it should be clear that the bridle of the invention can be employed with other curved kites.

A 4-line kite generally has two lines arriving at each of its two ends (or wing tips), a front line forward of the optimum center of lift of the kite, that can be called the "center point", and the rear line behind the center point. The front lines are preferably fixed to the body of the rider, for example by way of a belt. The rear lines are used for controlling the kite, turning and braking, and are preferably attached to a control bar.

When using a small kite, with a small aspect ration, the rider can rock the kite to its side by way of the control lines, in order to position it for relaunch, by directing the leading edge to catch the wind. However, as the aspect ratio of the kite increases with a larger kite, it becomes more difficult to launch the kite when it has fallen on its leading edge.

In a 4-line "ram air" kites or others kites whose main lines are attached to bridles, a row of bridles is attached over the entire length of the trailing edge. Thus, by pulling on the rear lines, it is possible to launch the kite positioned on its leading edge, as the kite take can then launch in "reverse gear".

It is not effective to use this method on curved kites, however, as merely connecting the rear lines to a row of bridles fixed on the trailing edge does not give good results. This method allows for re-launching in reverse gear, but the overall flight quality deteriorates due to the overall complexity and unwanted effect of the trailing edge bridles pulling during flight. It is also possible to relaunch a kite by providing direct lines from the trailing edge to the rider, but again the complexity of the additional lines provides a negative effect.

The bridle according to the present invention solves this problem. It makes it possible to re-launch a kite with only the basic 4 lines reaching the rider, while also allowing continued flight, turning and control of the power of the kite. Indeed, during normal flight, the rear lines of the inventive bridle work as in traditional 4-line mode, exerting tension on the wing tips; while during launching, this tension is entirely transmitted to the trailing edge to allow for easy lift in "reverse gear".

BRIEF DESCRIPTION OF THE DRAWINGS

FIG. 3 is a top perspective schematic view of a first embodiment of the invention having re-launch lines affixed between the trailing edge of the kite and the rear lines.

DETAILED DESCRIPTION OF THE INVENTION

Figure 1:
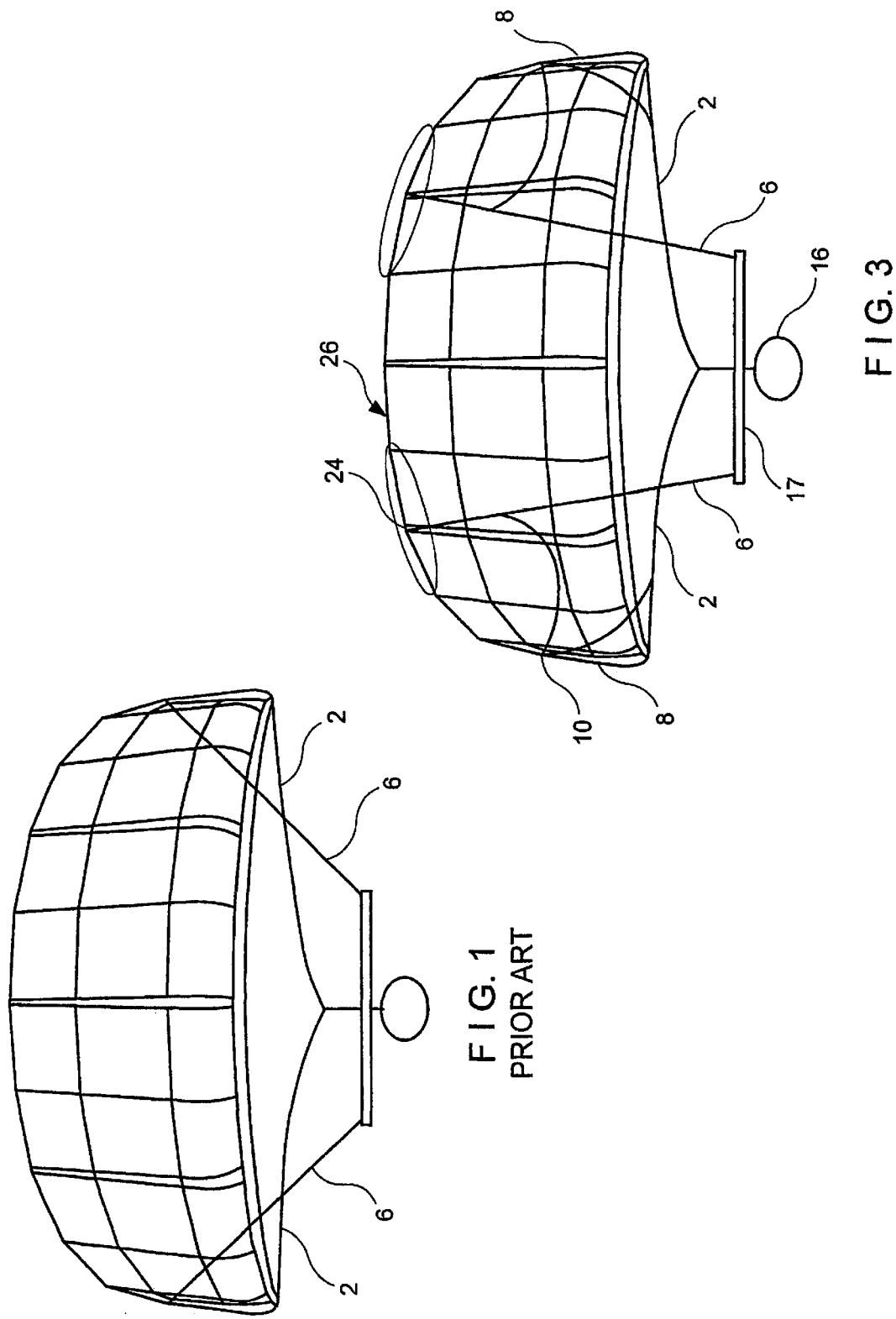
FIG. 1 is a top perspective schematic view of a standard 4-line kite of the prior art.
Figure 2:
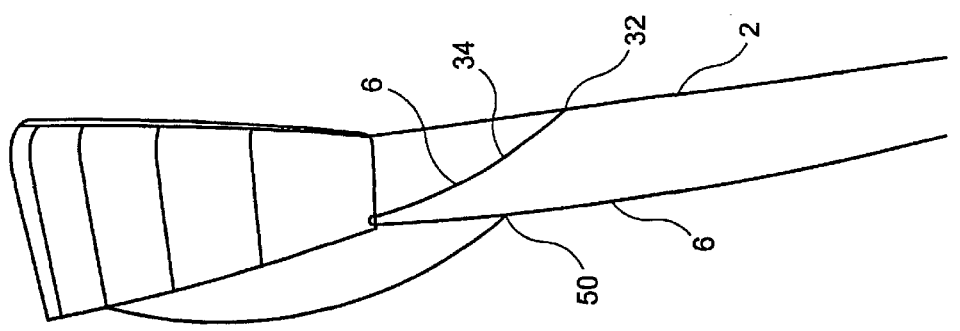
FIG. 2 is a front perspective schematic view of a standard 4-line kite of the prior art.

A prior art kite of the 4-line type is shown in FIGS. 1 and 2. With reference to FIGS. 3–6, the front line 2 is fixed forward of the center point 4, as in a known 4-lines kite. However, the rear line 6, instead of being attached to the wingtip 8 rearward of the center, passes through a pulley means 10 fixed at this same location, and then is fixed to the front line 2 at a location 32 between the connection point of the front line to the kite 14 and the free end 15 of the front line 2 connected to the rider 16. It is preferable for the wing tip, from front to back portion, to have a means for rendering the tip relatively rigid. An additional line, which can be referred to as a re-launch line 18, is attached at one end 20 to the rear line 6 at a location between the normal contact point of the rear line with the pulley means and the free end 22 of the rear line 6 connected to the control bar 17. The other end 24 of the re-launch line 18 is connected to the trailing edge 26, preferably at a location toward the center thereof.

Figure 6:
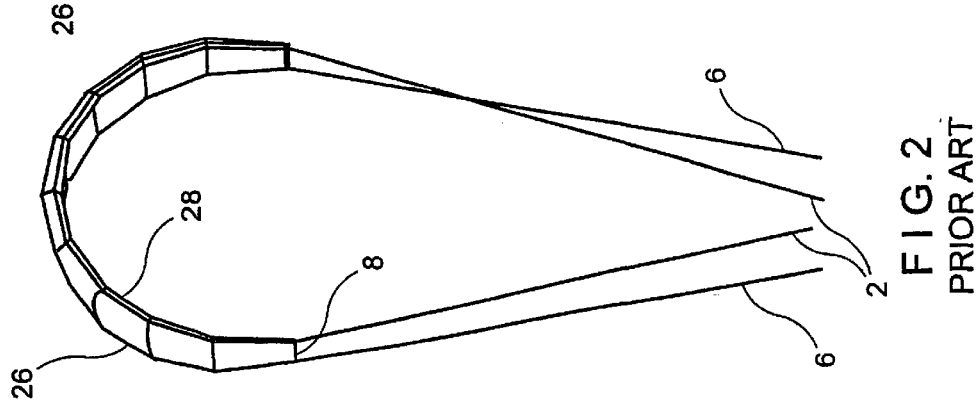
FIG. 6 is a view of FIG. 4, in a position of normal flight, wherein only light pressure is being applied by the pilot.
Figure 7:
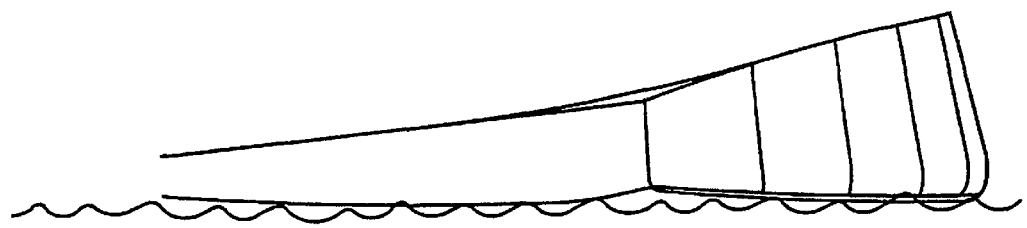
FIG. 7 is a side schematic view of the first embodiment of the invention, with the kite along the water surface prior to re-launch.
Figure 8:
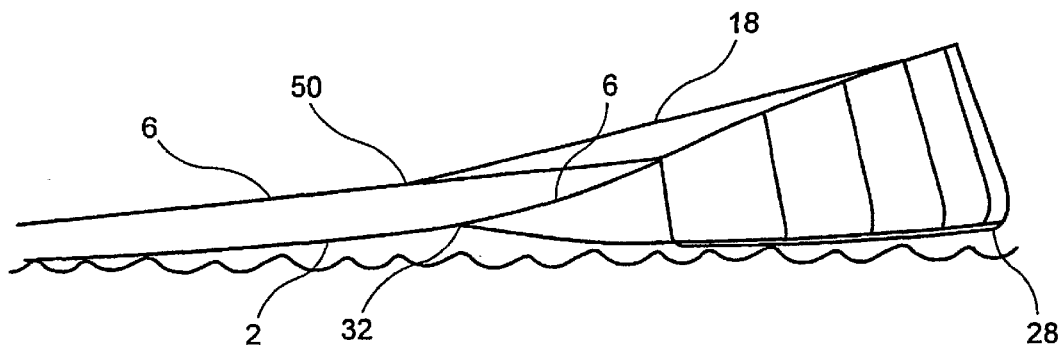
FIG. 8 is a view of FIG. 7, wherein the rear lines have been pulled during the re-launch effort.
Figure 9:
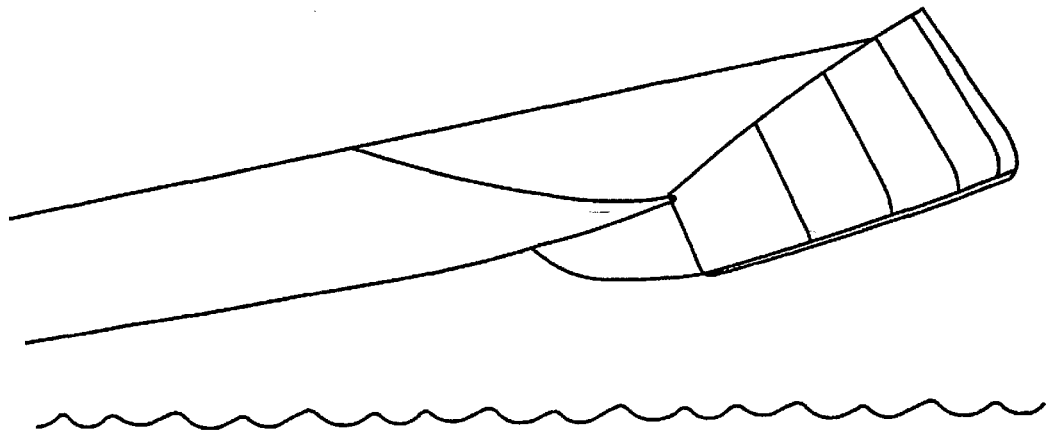
FIG. 9 is a view of FIG. 8, wherein full tension is applied to the re-launch lines to achieve re-launch.

As long as the kite is in normal flight, the re-launch line 18 is slack (FIG. 6). It has no effect on the flight, and does not slow down the kite even when the pilot makes turns the kite. The length and location of attachment of this re-launch line should be provided so as to achieve this effect. When the kite falls on its leading edge 28 (FIG. 7), the pilot pulls on the two rear lines 6 until the re-launch lines tighten and draw on the trailing edge (FIGS. 8, 9).

Figure 4:
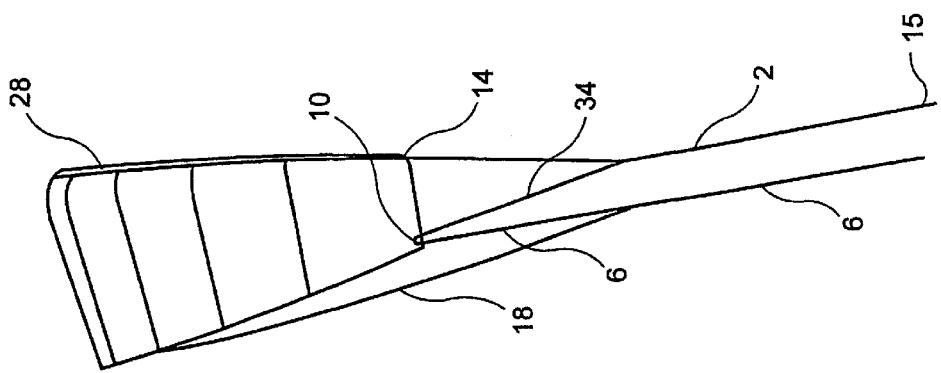
FIG. 4 is a side schematic view of the first embodiment, in a position wherein the pilot has pulled strongly down on the rear lines during flight.
Figure 5:
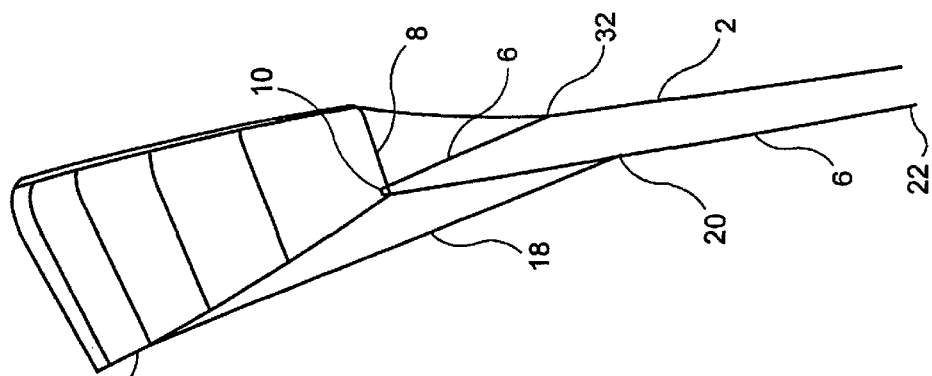
FIG. 5 is a view of FIG. 4, in a position of normal flight, wherein medium downward pressure is being exerted on the rear lines by the pilot.

This effect is made possible because of the presence of the pulley means 10. During flight, the front lines 2 of the kite are kept taught by way of the force on the leading edge of the kite (FIGS. 4, 5). This keeps the rear lines 6 taught as force is transferred to the rear line through the front connection point 32. In this manner, a pulling of the rear lines applies force on the wing tip at the point of connection to the pulley means. When the kite falls, the front line slackens, and a pulling on the rear lines no longer transfers force directly against the wing tip, as the rear line is not held taught by the front line. At this stage, a pull on the rear lines draws the lines through the pulley means, thus transferring the pulling force to the trailing edge by way of the re-launch lines (FIGS. 8, 9). The kite starts to fly in reverse fashion, trailing edge first, then turns to the leading edge for normal flight after the re-launch is effected. At this time, the pilot slackens a back line and the kite starts to fly ahead and turns.

If the wind is strong, a re-launch can also be achieved by drawing on a rear line only. The kite turns then on itself, then, by controlling the tension on a back line, the pilot keeps it on his tip then takes it off. Or, the pilot can draw on the two front lines and the kite takes off directly once posed on its trailing edge.

The system as described "gears down" or reduces the amount of required exertion on the control bar by the pilot, because of the presence of the pulley means. This also means that the control bar should be moved approximately twice the distance as compared to a standard 4-line kite, in order to obtain the same effect on the kite. If for example the pilot pulls the bar 20 cm down, this will result in an approximate 10 cm lowering of the rear wing tip.

This effect has an advantage in strong wind and a disadvantage in light wind, as will be explained. In strong wind, a power kite is generally very fast, even dangerous. The fact of gearing down the action on the bar makes the kite less sensitive to the pressures exerted intentionally or accidentally by the pilot. The result is that the kite is slower to react, but less prone to sudden changes in direction, and thereby safer. In fact, when a kite (such as a small kite) does not suffer from inherent difficult in launching, the rider may not need the re-launch lines at all. In this case, a particular embodiment of the bridle employs the pulley means, and the rear line attached to the front line as set forth above, but without the re-launch lines. The bridle according to this embodiment is useful in dampening the reactions of the kite, and providing a safer ride.

Figure 10:
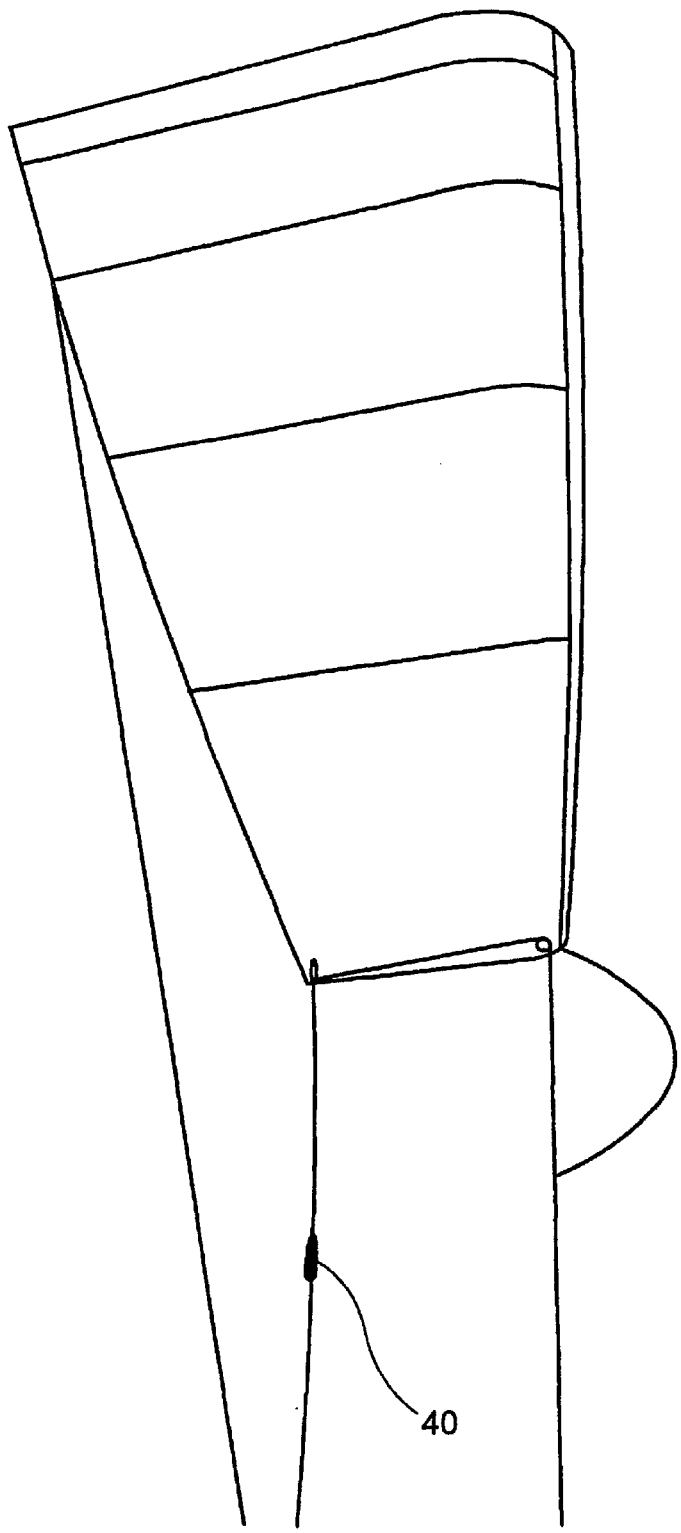
FIG. 10 is a side schematic view of a second embodiment of the invention with bypass device, shown with front line slack in re-launch mode.
Figure 11:
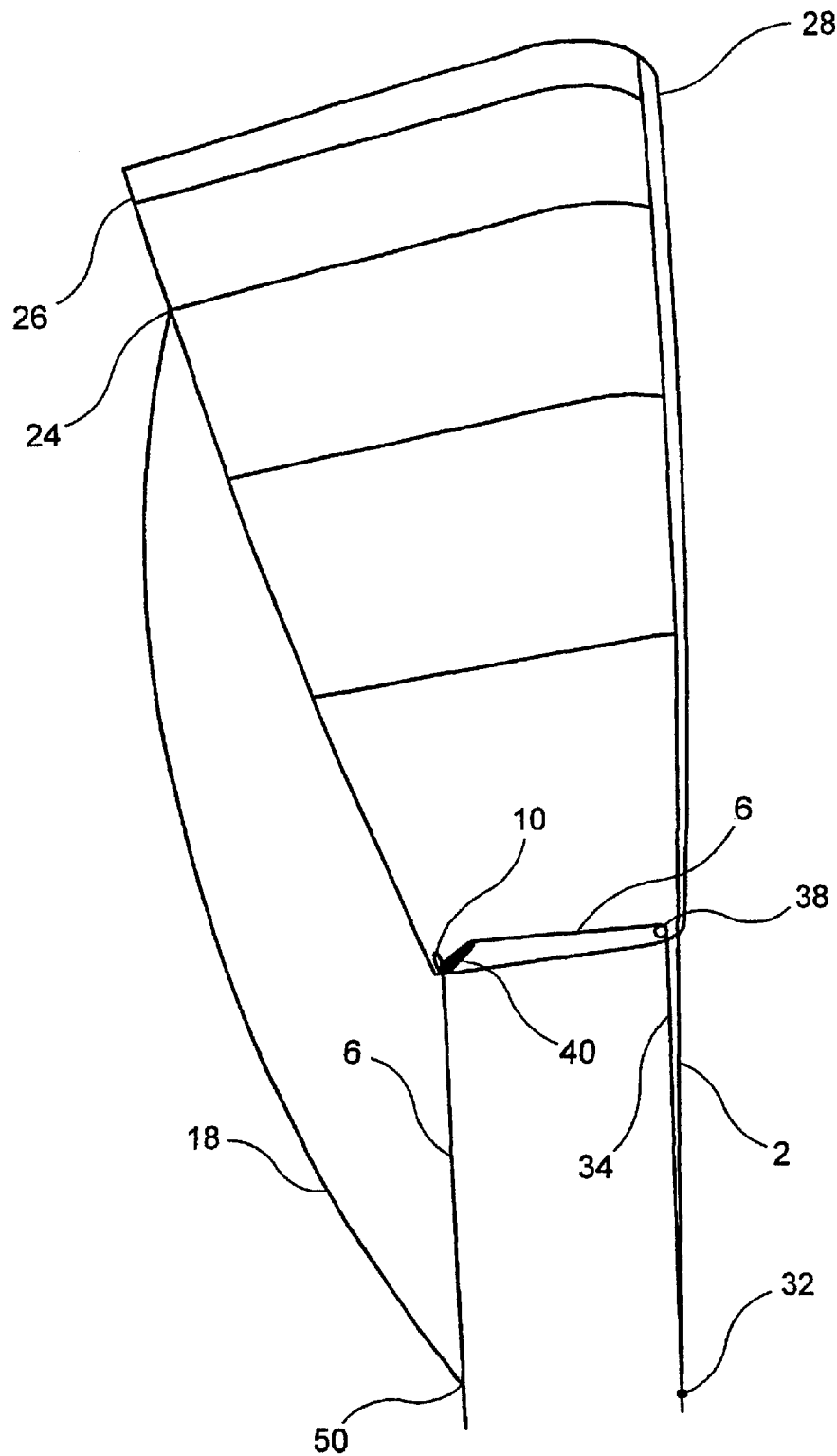
FIG. 11 is a view of FIG. 10, shown in flight mode with bypass device locked against first pulley means, and re-launch line slack.

In light wind, this reduction in control exertion becomes a disadvantage. Particularly for a large size kite, the pilot must double the exertion on the control bar in order to turn the kite or regulate the power of the kite. For this situation, a second embodiment of the bridle was developed, to allow a re-launching by way of re-launch lines as set forth above, while allowing a bypass of the reduction effect during normal flight. As shown in FIGS. 10, 11, in this embodiment, the portion 34 of the rear line 6 leaving from the connection point 32 to the front line 2, does not go directly to the pulley means, which will now be referred to as the first pulley means 10. Instead, a second pulley means 38 is located towards the front of the wing tip, preferably adjacent the location where the front line is connected to the kite. The rear line first passes through this second pulley means 38. As with the first pulley means 10, the second pulley means 38 can be a pulley, or any low friction device which maintains the position of the line while allowing the line to move through that position. As with the first pulley, the second pulley means may be simply an eye hook or ring, attached to the wing tip to maintain a relatively rigid position, with the ring oriented generally perpendicular to the plane of the wing tip so that the line is maintained generally parallel to the plane of the wing tip, and preferably generally perpendicular to the direction of the lines running toward the pilot. During re-launch, this second pulley means merely redirects the path of the rear line, and the effect of the slackening of the front line on the ability of the pilot to re-launch by pulling on the rear lines, is the same as above. However, a further structure is provided to allow the pilot to bypass the gear down effect of the pulley system during flight.

Figure 12:
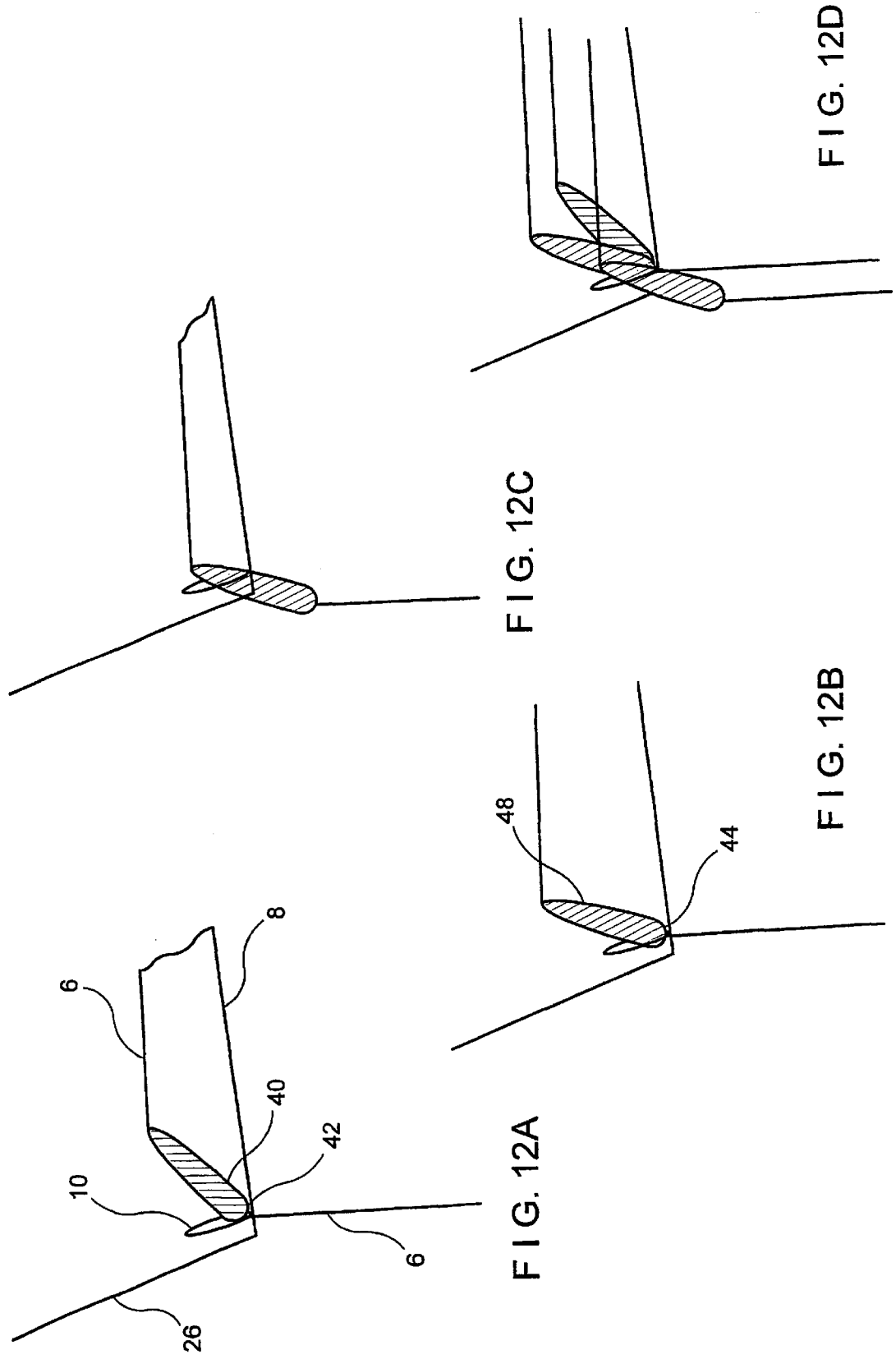
FIG. 12A shows a schematic close-up of the bypass device interacting with a ring as first pulley means, with the bypass device caught against the ring.
FIGS. 12B–D show the view of FIG. 12A with the bypass device and accompanying portion of the rear line being passed through the ring upon slackening of the front line.

The bypass device 40 is formed as a structure residing on the rear line 6. In the embodiment shown, the bypass device is symmetrical about its longitudinal axis. The leading end 42 of the bypass device is characterized by a slightly sloped shoulder portion 44, radiating outward from the center axis aligned with the rear line in almost perpendicular fashion. The radius and degree of slope of the leading end should be sized such that, when the rear line is drawn in the direction of the leading end of the bypass device (that is, when the rear line is pulled downward by the pilot) the shoulder portion catches against the first pulley means, preventing the bypass device from being drawn through or around the first pulley means, and therefore holds the rear line against further movement relative to the first pulley means (FIGS. 11, 12A). Thus, the radius of the bypass device should be preferably slightly greater than thickness of the rod forming the ring, but the diameter of the bypass device should be less than the inside diameter of the ring, for reasons which will be explained below. Therefore, during normal flight, when the rear line is taut (FIG. 11), once the bypass means catches on the first pulley means, a further controlling action by the pilot on the rear lines results in a direct (i.e. not geared down) force on the rear portion wing tip, allowing control by the pilot as in a standard 4-line kite.

Figure 13:
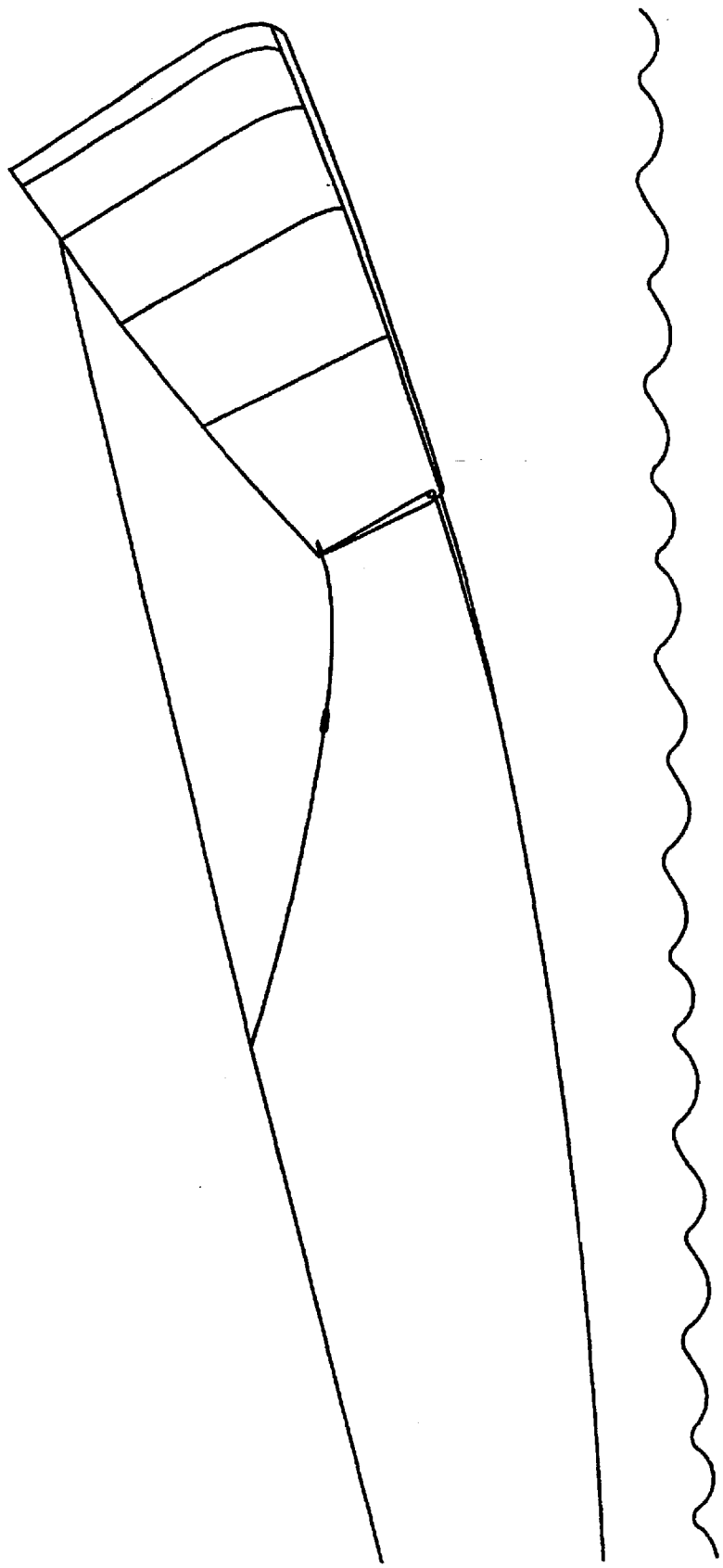
FIG. 13 shows a side schematic view of the second embodiment during re-launch.

When it is required to go to re-launch mode, the pilot, drawing as previously explained on the back lines, slackens the front lines (FIGS. 10, 13). With respect to FIGS. 12B, 12C, 12D, The bypass device is sized to allow passage through or around the first pulley means with relative ease when the line is slack. With the line slack, the shoulder does not catch on the ring (first pulley means) when the rear line is pulled. As the bypass device is pulled through the ring, this allows the downward force exerted on the rear line by the pilot to be transferred to the trailing edge by way of the re-launch line. It is for this reason that the bypass device should have some degree of slope at its shoulder, leading to a rounded shoulder edge, to allow for the bypass device to pass through the first pulley means. Once re-launch is achieved, and normal flight resumes, the front line pulls tight, thus pulling the rear line tight. As the rear line is pulled tight, the bypass device travels with a portion of the rear line towards the first pulley means, and the bypass device travels back through the first pulley means. Thus, the bypass device can be shaped at its trailing end 48, away from the shoulder, as a relatively long, steep slope narrowing toward the trailing end. Upon further drawing on the rear lines during flight, the bypass device against catches against the first pulley means by way of its leading end shoulder, and normal flight is possible. While this particular shape of the bypass device is particularly effective, other bypass means are also envisioned. Such device needs only to be of a structure which will catch when pressure is exerted, but which will release the catch when pressure is released. A ratchet, or mechanical latch therefore may be possible. For example, first pulley means having an internal ratchet may be employed. Such a ratchet may allow passage of the line when slack, but may grasp the line when the line is tight, which may avoid the necessity of the separate bypass means.

As for the second pulley means, it can be seen that its main purpose is to keep the rear line, and hence the longitudinally shaped bypass means attached thereto, in a position generally parallel to wing tip (to the direction of flight) to allow for the bypass device to pass through the ring when the line is slack. In the embodiment shown, the second pulley means acts to lift the rear line slightly higher (FIG. 10) toward the front portion of the wing tip, so as to allow the bypass means to pass through the first pulley means upon slackening of the line (FIGS. 12A–D). If second pulley means is not present, then the rear line coming up at an angle, directly from the point of attachment to the front line, presents too severe an angle for this particular shape of bypass device. However, it is contemplated that alternative bypass means structures, such as an internal ratchet, which would not be affected by the angle of approach to the first pulley means, would not need the second pulley means.

With respect to the connection points 32 of the rear line to the front line, and the rear line to re-launch line 50, these connections may be made by any means which will result in a strong, fixed connection. A knot may be sufficient. Or, a ring or Y-shaped connector may be provided, to which the ends of the lines may travel or be tied. Thus, it can be seen that while the front 'line' is defined as that line connecting the front portion of the wing tip to the pilot, it need not be a single line. The effect will be the same if three separate lines are connected at front Y junction 32, or if a line runs from the front wing tip to the Y junction, then along the rear 'line' towards the first pulley means, with a separate line running from the Y junction to the pilot, so long as there is no relative movement between the lines at the Y junction. The same point should be understood for the rear Y junction 50.

The arrangement of bridle lines can be slightly different to reduce the line lengths or to avoid tangles, this not changing the principle of the invention. The lengths of lines and adjustments can vary greatly depending on flying and take off characteristics desired by the designer.

What is claimed is:

1. A flexible, propulsive wing having a leading edge and a trailing edge extending on either side thereof to wing tips on respective sides of the wing, each wing tip having at least two lines connected to and extending therefrom, a front line connected fixedly to the wing tip towards a front portion thereof, and a rear line connected to the wing tip towards a rear portion thereof, each of the front and rear lines having a fixed end and a free end, the fixed end of each of the front lines being connected to the wing tip, characterised in that:
   the rear portion of the wing tip comprises a first pulley means attached thereto, the rear line being connected to the rear portion of the wing tip through the first pulley means,
   the rear line being fixedly connected at the fixed end thereof to the respective front line at a location of the front line between the fixed end and the free end thereof, the rear line contacting the pulley means at a location of the rear line between the fixed end and the free end thereof.

2. The wing of claim 1, further characterised in that a third line is provided at each respective side of the wing, each third line being fixedly connected at one end thereof to the respective rear line at a location between the free end thereof and the first pulley means, the other end of the third line being fixedly connected to the trailing edge at a location along the trailing edge between the wing tip and the center portion of the trailing edge.

3. The wing of claim 2, further characterised in that it comprises
   a bypass means for retaining the rear line fixed in position with respect to the wing tip when the front line is taut, and for allowing the rear line to move relative to the first pulley means when front line is slack.

4. The wing of claim 3, wherein the bypass means is a bypass structure affixed to the rear line, having an increased diameter with respect to the rear line.

5. The wing of claim 4, wherein the bypass structure has a leading end radiating outwardly to form a shoulder with a radius and degree of slope which is able to be retained by the first pulley means when the rear line is taut, but which can move through the first pulley means when the line is slack.

6. The wing of claim 5, wherein the bypass structure has a trailing end shaped as a tapered end narrowing from the shoulder.

7. The wing of claim 4, further characterised in that it comprises
   a second pulley means located adjacent the front portion of the wing tip, the rear line running from the connection point with the front line, through the second pulley means, then through the first pulley means.

* * * * *